United States Patent [19]

Tsuchiya et al.

[11] Patent Number: 5,287,224
[45] Date of Patent: Feb. 15, 1994

[54] APPARATUS FOR RECORDING A VIDEO SIGNAL HAVING PROGRAMS AND CONTROL DATA

[75] Inventors: Kazuhisa Tsuchiya, Tokyo; Michio Mita, Kanagawa, both of Japan

[73] Assignee: Sony Corporation, Tokyo, Japan

[21] Appl. No.: 950,741

[22] Filed: Sep. 24, 1992

Related U.S. Application Data

[63] Continuation of Ser. No. 542,904, Jun. 25, 1990, abandoned.

[30] Foreign Application Priority Data

Jun. 30, 1989 [JP] Japan .................................. 2-168583

[51] Int. Cl.⁵ .......................................... G11B 27/02
[52] U.S. Cl. .................................. 360/14.3; 360/33.1
[58] Field of Search ................. 360/14.3, 19.1, 33.1, 360/13, 14.2, 18

[56] References Cited

U.S. PATENT DOCUMENTS

| | | | |
|---|---|---|---|
| 3,084,215 | 4/1963 | Bounsall | 360/14.2 |
| 3,646,260 | 2/1972 | Bolger | 360/14.2 |
| 4,142,209 | 2/1979 | Hedlund et al. | 358/342 |
| 4,774,600 | 9/1988 | Baumeister | 360/14.3 X |
| 4,802,023 | 1/1989 | Williams | 360/14.3 |
| 4,837,638 | 6/1989 | Fullwood | 360/14.3 X |
| 4,858,027 | 8/1989 | Sashou et al. | 360/14.3 X |

OTHER PUBLICATIONS

American National Standard for Television-time and Control Code-Video and Audiotape for SOS-line/60 field systems, ANSI/SMPTE 12M-1986.

*Primary Examiner*—Andrew L. Sniezek
*Attorney, Agent, or Firm*—William S. Frommer; Alvin Sinderbrand

[57] ABSTRACT

In a video signal recording apparatus, information about a video commercial program or message (CM) is recorded in the vertical blanking interval (VBI) of the video signal constituting the commercial message so that the information remains with the commercial program or message even during subsequent editing. Video signals representing a plurality of commercial messages and having respective information in the vertical blanking intervals are serially recorded on a master tape while generating stop code data and recording the stop codes in a longitudinal track on the master tape. Further, a video signal reproducing apparatus is described which can extract data from the VBI and longitudinal track of a tape, process the data and automatically terminate the reproduction after reproducing a stop code.

6 Claims, 12 Drawing Sheets

USER'S CONTROL CODE

| UB8 | UB7 | UB6 | UB5 | UB4 | UB3 | UB2 | UB1 | |
|---|---|---|---|---|---|---|---|---|
| | | | | 1 0 0 0 0 | 0 0 1 1 | 1 1 1 1 | 1 1 1 1 | |
| CHECKSUM | | DATA SERIAL NO. | | CONTROL CODE TYPE | CODE TYPE / DATA TYPE M/S | START CODE | | 1ST FRAME |
| | | | | 0 0 0 0 | 0 0 0 0 | 0 0 0 0 | | |
| '00' | | '00' | | BIT MAP 2 | | BIT MAP 1 | | 2ND FRAME |

Fig.3B

CONTENT OF BIT MAP

| BIT MAP1 | | | |
|---|---|---|---|
| BIT3 | BIT2 | BIT1 | BIT0 |
| | AUDIO BILINGUAL | AUDIO STEREO | AUDIO MONAURAL |

| BIT MAP2 | | | |
|---|---|---|---|
| BIT3 | BIT2 | BIT1 | BIT0 |
| | | | |

Fig. 4

| MATERIAL CODE | UB8 | UB7 | UB6 | UB5 | UB4 | UB3 | UB2 | UB1 | |
|---|---|---|---|---|---|---|---|---|---|
| 1ST FRAME | CHECKSUM | | DATA SERIAL NO. | | CONTROL CODE TYPE | DATA TYPE M/S / CODE TYPE | START CODE | | |
| | 0 | 0 | 0 | 0 | 1 0 0 1 | 0 0 1 0 | 1 1 1 1 | 1 1 1 1 | |
| 2ND FRAME | DISPLAY LEFT CORNER CHARACTOR | | | | BYTE COUNT | USER'S CODE ASCII | ATTRIBUTE (ID OF MATERIAL) | | |
| | | | | | 0 0 1 1 0 0 | 0 0 0 0 1 1 0 0 | 0 0 0 0 0 0 0 1 | | |
| 3RD FRAME | ——— MATERIAL ID 12 BYTES ——— | | | | | | | | |
| 4TH FRAME | | | | | | | | | |
| 5TH FRAME | 'FF' | | 'FF' | | DISPLAY RIGHT CORNER CHARACTERS | | | | |
| | 1 1 1 1 1 1 1 1 | | 1 1 1 1 1 1 1 1 | | | | | | |

B SCREEN

Fig.13C

C SCREEN   DISPLAY AT MATERIAL END POSITION

APPARATUS FOR RECORDING A VIDEO SIGNAL HAVING PROGRAMS AND CONTROL DATA

This application is a continuation of application Ser. No. 07/542,904, filed Jun. 25, 1990, now abandoned

BACKGROUND OF THE INVENTION

1. Field of the Invention

The present invention relates to a video signal recording and reproducing apparatus which is applied to make a master tape of a video CM (commercial message) to automatically transmit the CM.

2. Description of the Prior Art

A video CM recorded by means of a VTR (video tape recorder) is used during the CM broadcasting of a television broadcast. In the video CM, a plurality of CM materials are sequentially recorded on one magnetic tape. Hitherto, material information regarding the CM material such as the content of the CM, the sponsor, and the like is inserted as a telop into a picture plane just outside the picture plane which is actually broadcast.

When changing the information regarding the CM material, hitherto, it has been necessary to remake the telop, which is troublesome. There is also known a method of forming material information as user's bits of a longitudinal time code (LTC) which is recorded on a track in the longitudinal direction of the tape. However, there is a risk that when the CM material is rewritten, the time code LTC will be omitted or will not coincide with the rewritten CM material.

OBJECTS AND SUMMARY OF THE INVENTION

It is, therefore, an object of the present invention to provide a video signal recording apparatus in which by forming information regarding a CM material in the user's bits of a vertical blanking interval time code (VITC) recorded in conjunction with the CM material, the information corresponding to the CM material can be prevented from being separated from the CM material.

A further object of the present invention is to provide a video signal recording apparatus in which stop information to cause the VTR to stop at a particular point is recorded in the user's bits of a time code in the longitudinal direction (LTC) of a master tape on which a plurality of CM materials are recorded in series for permitting the transmission of the CM materials to be easily monitored and controlled using the stop information.

It is another object of the present invention to provide an information signal reproducing apparatus for which during reproduction of a tape in which stop information was recorded, by display of an indication on a monitor in response to the reproduced stop information, the fact that transmission of a CM occurred, and the reproducing apparatus thereafter entered standby mode can be easily checked.

According to an aspect of the present invention, there is provided a video signal recording apparatus for recording a video signal, composed of a plurality of programs, and related control data on a recording medium, comprising:

first time code generating mean for generating first time code data having a user's bit area in which information data relating to the contents of a CM program recorded in a CM video signal are formed;

inserting means for receiving said video signal and said first time code data and for providing an output signal in which the first time code data are inserted into a predetermined period in at least a selected one of said vertical blanking intervals of the CM video signal;

second time code generating means for generating second time code data having a user's bit area in which stop control data used for controlling transport of a recording medium are formed; and recording means for recording said output signal of said inserting means on a video track of a recording medium and for recording the second time code data on a longitudinal track of the recording medium such that the stop control data are positioned at a predetermined location of the longitudinal track.

According to another aspect of the invention there is provided an information signal reproducing apparatus for reproducing an information signal having a plurality of programs composed of video and audio signals recorded on an information track of a recording medium, said recording medium further having thereon a longitudinal track on which is recorded both information data relating to the contents of the CM programs, and stop control data, the information signal reproducing apparatus comprising:

tape transport means for transporting the recording medium during reproducing of said information signal recorded on said information track;

reproducing means for reproducing the information data recorded on the longitudinal track, displaying means for displaying the information data reproduced by the reproducing means, stop control means for stopping the transport of the recording medium in respons to the stop control data reproduced from said longitudinal track by the reproducing means, and control means for controlling the displaying means such that the displayed information data are modified upon reproduction of the stop control data.

In this invention, the material information regarding the CM material is recorded in the user's bits of a time code in the vertical blanking period of the video signal of the CM material, preventing the CM material and the material information from being separated.

Further, a stop code is recorded in the user's bits of the time code in the longitudinal direction of the master tape permitting the completion of the transmission of the CM material, standby state of the transmission of the CM material, and the like to be easily monitored and controlled.

The above, and other, objects, features and advantages of the present invention will become readily apparent from the following detailed description thereof which is to be read in connection with the accompanying drawings.

BRIEF DESCRIPTION OF THE DRAWINGS

FIGS. 1 1A and 1B are a schematic diagrams showing a tape format of a master tape which is used in an embodiment of the present invention;

DETAILED DESCRIPTION OF THE PREFERRED EMBODIMENTS

An embodiment of the present invention will be described hereinbelow with reference to the drawings.

Figures 1, 1A:
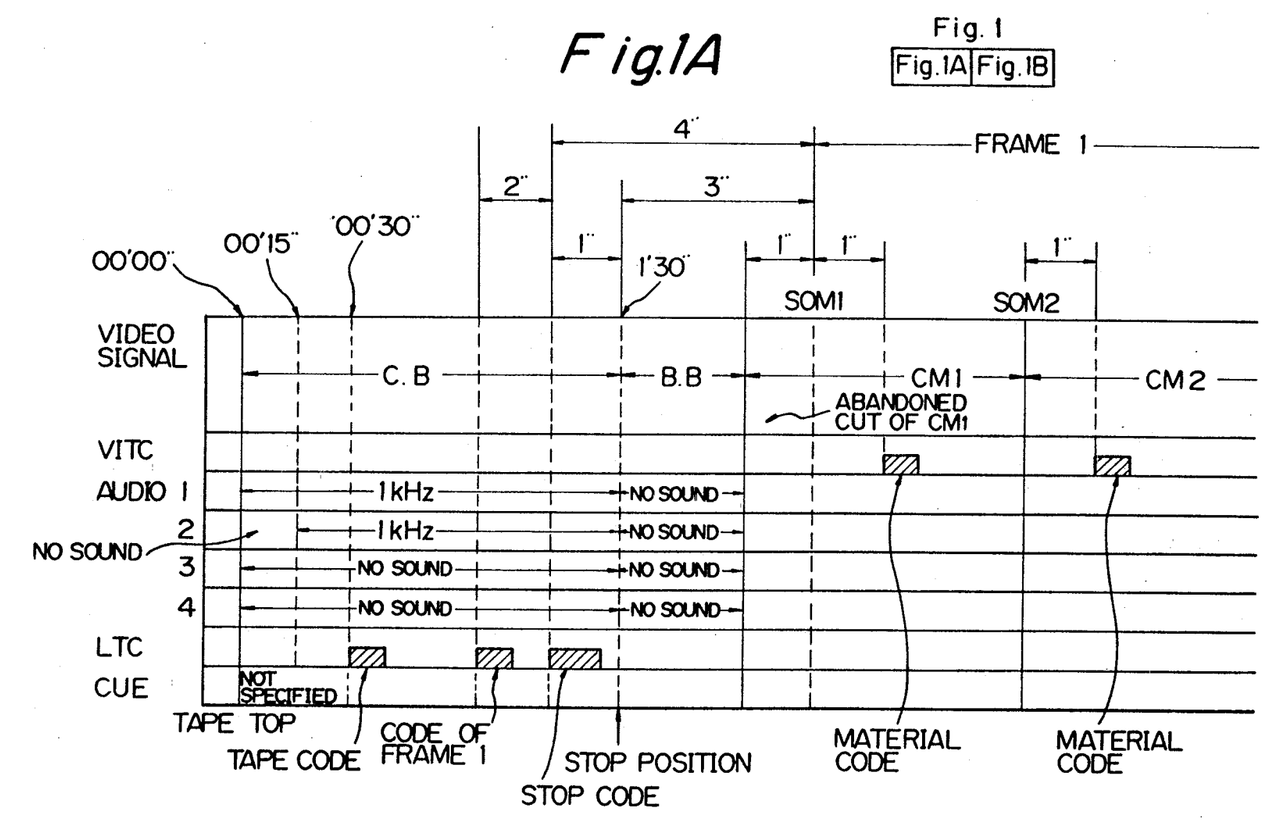
Figure 1B:
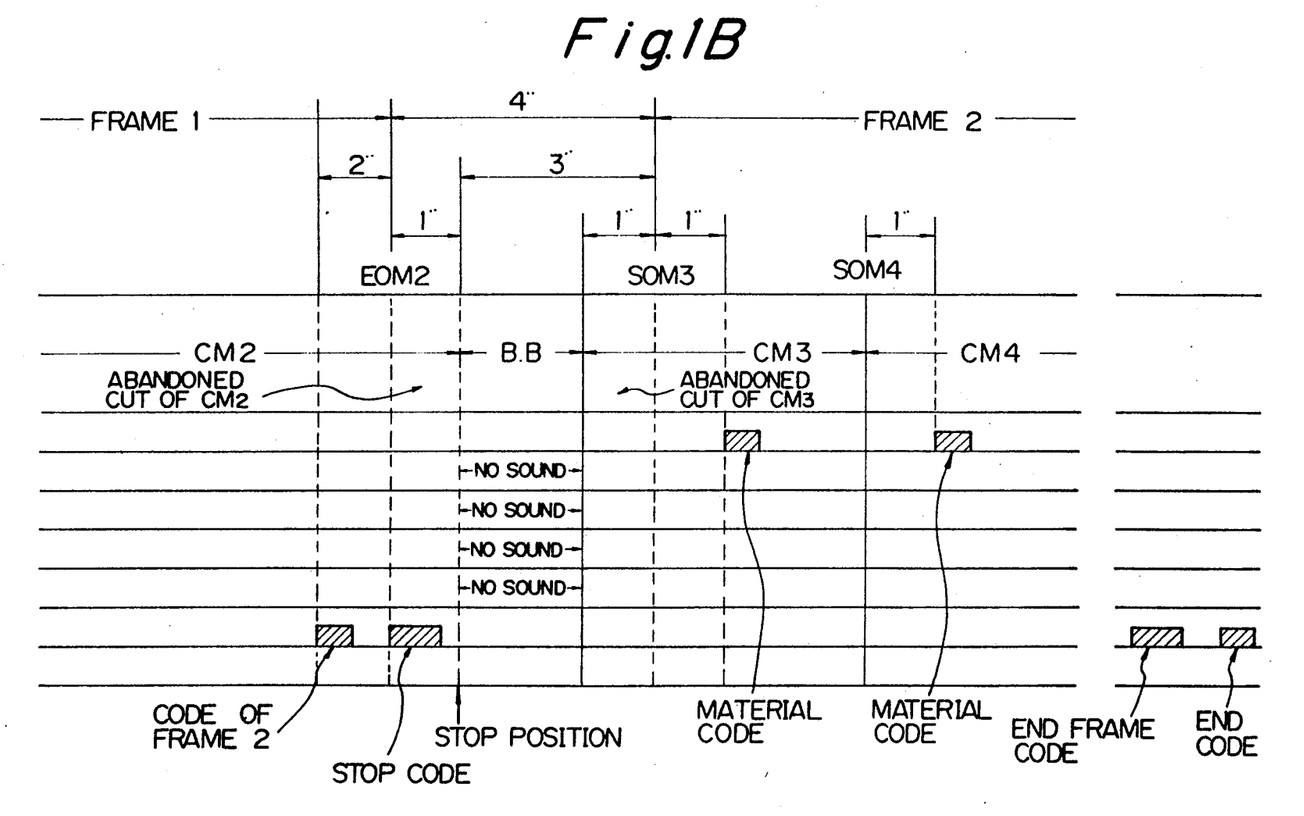

FIGS. 1A and 1B show a tape format in one magnetic tape (referred to as a master tape) in which a plurality of CM (commercial message) materials are recorded in series. A single continuous format is divided between FIGS. 1A and 1B.

The tape format comprises: a video signal area; a VITC area to record a material code, which will be explained later; and audio signal areas of channels 1 to 4. The tape format further comprises the following areas longitudinally recorded in longitudinal tracks an LTC (time code in the longitudinal direction) area to record a tape code, a stop code, and the like; and a cue area. The video signal area is formed as an oblique track. A VITC is repetitively recorded in two predetermined horizontal intervals in a vertical blanking period. The video signal area, audio signal areas, LTC area, and cue area are formed as tracks in the longitudinal direction of the tape.

The tape format is constructed in a manner such that a header area is formed on the tape top side and areas of commercial frames (hereinafter, abbreviated as CM frames), for instance, are sequentially formed from the tape top side to the tape end side.

The following signals are recorded in the header:

Video signal area—A color bar signal (C, B) to check a signal line and a subsequent black burst signal (B, B) are recorded. A boundary point between the color bar signal (C, B) and the black burst signal (B, B) is defined as a stop position (STOP).

VITC area—non-recorded

Audio signal areas:

Channel 1—A test signal of 1 kHz is recorded in the area corresponding to the color bar signal (C, B). No sound is recorded in the area corresponding to the black burst signal (B, B).

Channel 2—A test signal of 1 kHz is recorded in a substantial portion of the area corresponding to the color bar signal (C,B). No sound is recorded in the area corresponding to the black burst signal (B,B).

Channel 3—No sound

Channel 4—No sound

LTC area—An LTC (for instance, a SMPTE time code) which is a time code in the longitudinal direction is continuously recorded. A tape code, a code of the frame 1, and a stop code are recorded as a user's bit into the area corresponding to the color bar signal (C,B) at timings as shown in FIG. 1.

Cue area—Not particularly specified.

As shown in FIGS. 1A and 1B, each CM frame which is recorded and formed after the header is arranged at an interval of four seconds. An abandoned cut area of one second is provided at each of the tape top side and the tape end side of each CM frame. On the other hand, time addresses in the LTC area are continuous.

Figure 2:
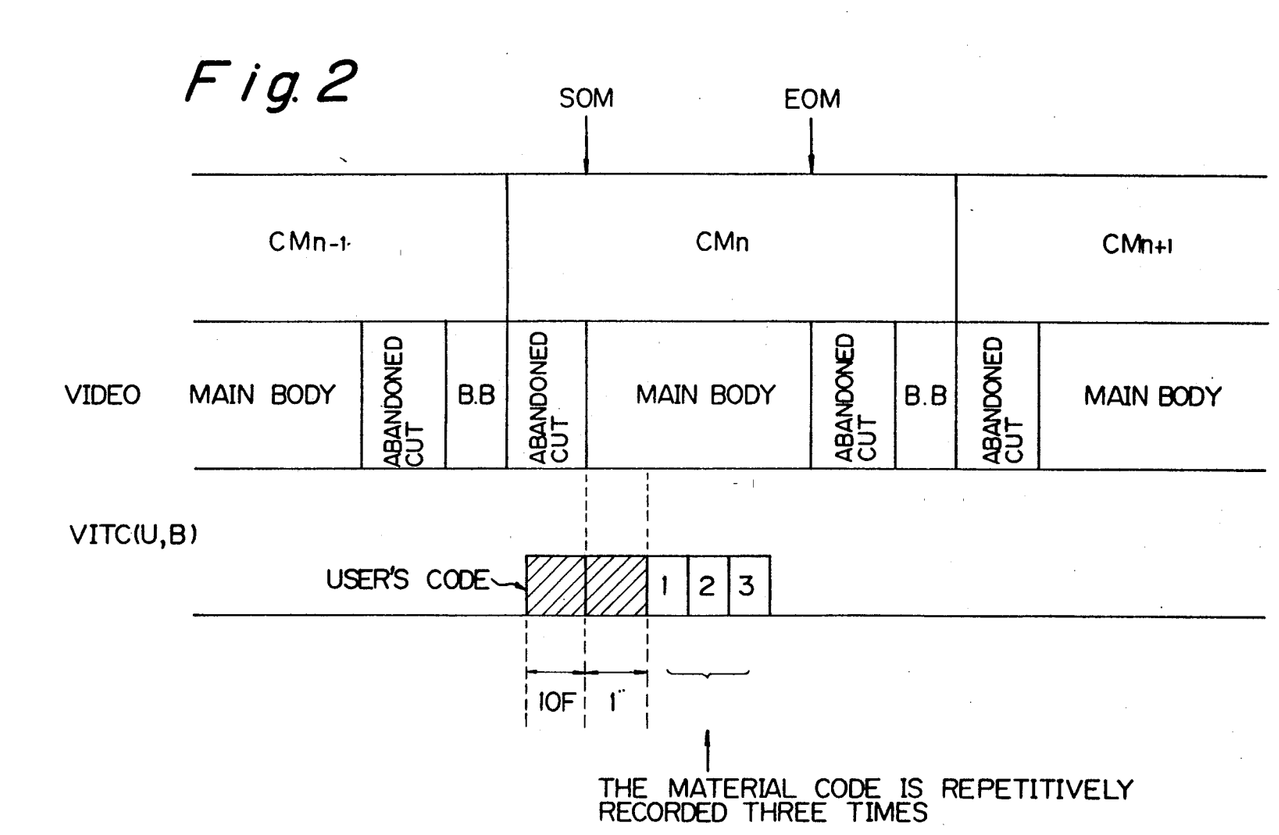
FIG. 2 is a schematic diagram showing recording positions of a user's code and a material code.

As shown in FIGS. 1A and 1B, the area of each CM frame is formed by one or a plurality of CM materials. Each of the CM materials has a tape format as shown in FIG. 2, comprising:

Video signal area—An abandoned cut area which is not broadcast, a main body of the CM, and an abandoned cut area are sequentially recorded on the tape top side. A black burst signal is recorded on the tape end side. A boundary between the abandoned cut area and the main body on the tape top side is set to an on-air start point (SOM). On the other hand, a boundary between the main body and the abandoned cut area in the rear portion is set to an on-air end point (EOM).

VITC area—A user's code and a material code are recorded.

User's code—The user's code of ten VITC frames is recorded in the region corresponding to the abandoned cut area on the tape top side up to the on-air start point (SOM). The user's code of 30 VITC frames (corresponding to one second) is recorded in the region corresponding to the area of the main body beginning at the on-air start point (SOM). The user's code is not shown in FIG. 1.

As shown in FIG. 3, the data format of the user's code spans two VITC frames. Therefore the user's code is recorded five times in the ten VITC frames before the on-air start point (SOM) and is recorded 15 times in the thirty VITC frames after the on-air start point (SOM).

Figure 4:
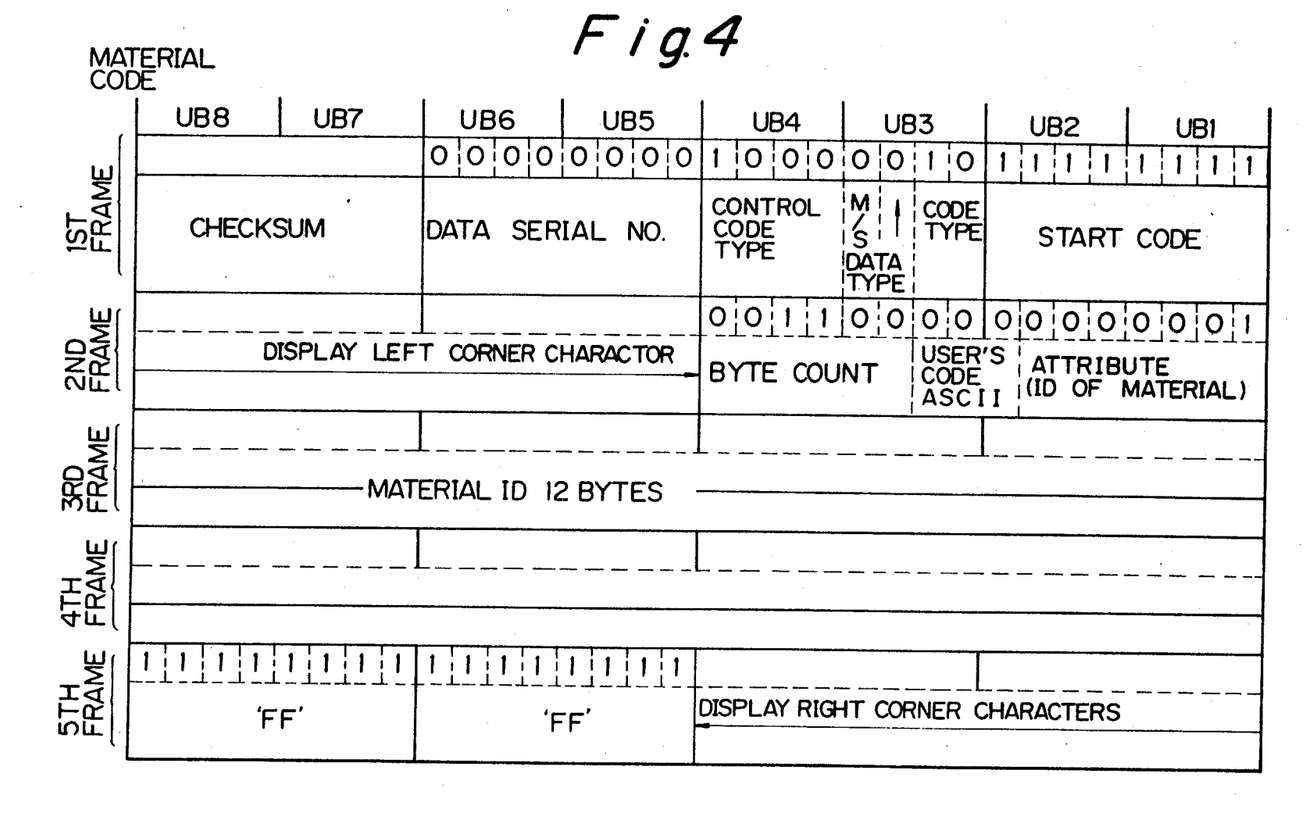
FIG. 4 is a schematic diagram showing a data format of a material code.

Material code—The material code is repetitively recorded three times after the user's code recorded after the on-air start point (SOM). As shown in FIG. 4, the material code spans five VITC frames.

As shown in FIGS. 1A and 1B, the remainder of each CM frame comprises:

Audio signal areas:

Channel 1—The signal corresponding to the recorded CM is recorded. No sound is recorded in the area corresponding to the black burst signal preceding the CM frame.

Channel 2—The signal corresponding to the recorded CM is recorded. NO sound is recorded in the area corresponding to the black burst signal preceding the CM frame.

Channel 3—The signal corresponding to the recorded CM is recorded. No sound is recorded in the area corresponding to the black burst signal preceding the CM frame.

Channel 4—The signal corresponding to the recorded CM is recorded. No sound is recorded in the area corresponding to the black burst signal preceding the CM frame.

LTC area—The code of the next CM frame is recorded two seconds before the on-air end point (EOM) of the current CM frame. The stop code is recorded after the on-air end point (EOM). After completion of all of the CM frames, the end frame code and the end code are recorded.

Cue area—Not particularly specified.

The data format of the user's code will now be described with reference to FIG. 3.

Figure 3A:
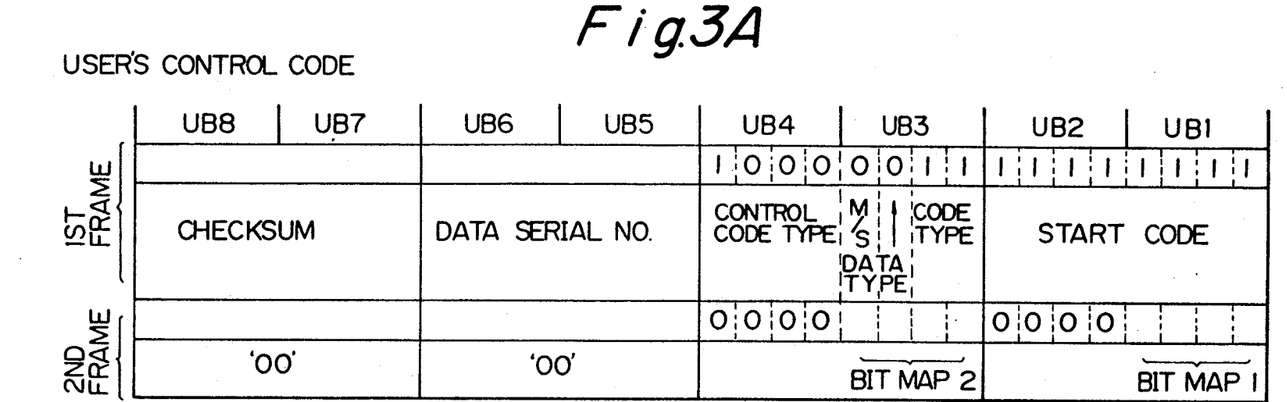
FIGS. 3A and 3B are a schematic diagrams showing a data format of a user's control code.

As shown in FIG. 3A, the data format of the user's code spans two frames and comprises user's bit group $UB_1$ to $UB_8$ each consisting of four bits of the VITC.

The $UB_1$ and $UB_2$ of the first frame are set to a start code indicative of the start of data and FFH (first frame, H is a hexadecimal indication) is recorded in $UB_1$ and $UB_2$.

A code type indicative of the kind of code is recorded in the first and second bits of $UB_3$ of the first frame:

| Bit 2 | Bit 1 | Code type |
|---|---|---|
| 0 | 0 | Tape code |
| 0 | 1 | CM frame code |
| 1 | 0 | Material code |
| 1 | 1 | Control code |

Whether the data is essential or auxiliary is indicated by the third bit of $UB_3$ of the first frame. The essential data denotes data which the co ntrol apparatus truly needs. The auxiliary data is additional data:

| Bit 3 | Data type |
|---|---|
| 0 | Essential data |
| 1 | Auxiliary data |

The kind (main or sub) of data in the code is indicated by the fourth bit of $UB_3$ of the first frame. A new kind of data is shown by combining the data kind and the code type:

| Code type | 0 (main) | 1 (sub) |
|---|---|---|
| Tape code | Tape data | Frame data |
| Frame code | Frame data | Material data |
| Material code | Material data | Inhibition of use |

In the case of the control code, the third bit is set to the essential data and the fourth bit is set to the main data.

$UB_4$ of the first frame indicates the control code type and the following bit patterns are defined:

| Content | bit 7 | bit 6 | bit 5 | bit 4 |
|---|---|---|---|---|
| Non-control code | 0 | 0 | 0 | 0 |
| Stop code | 0 | 0 | 0 | 1 |
| End code | 0 | 0 | 1 | 0 |
| Reserved | : | : | : | : |
| User's code | 1 | x | x | x |

If the code type is not the control code, the control code type must be set to the non-control code. The use of "1111" as data of the code type is prohibited. As shown in the column of the user'code, when bit 7 is set to "1 ", the use object of the code is opened to the user.

$UB_5$ and $UB_6$ of the first frame indicate the data serial numbers. The data serial numbers denote sequence numbers when the same data is repetitively recorded as a countermeasure against errors. Sequence numbers are sequentially added to the fundamental format blocks (from the start code to the end gap) in each code and the sequence numbers in the data block are shown. The data serial numbers are formed by subtraction with the serial number of the last block set to "0". Such a construction is repeated each time a writing operation is executed.

The essential data and the auxiliary data ar set to the independent serial numbers.

A checksum is provided in $UB_7$ and $UB_8$ of the first frame. A value such that the total of all of the bytes from the code type data to the position before the end gap is set to 0 is inserted.

Figure 3B:
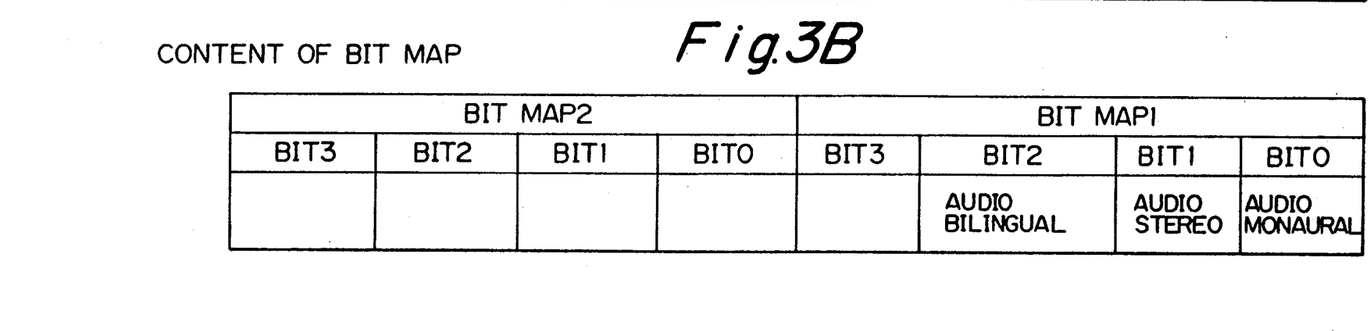

The four bits of $UB_1$ of the second frame are set to a bit map 1. The four bits of $UB_2$ of the second frame are set to "0000". As shown in FIG. 3B, the bit map 1 is used for flag bits. The data of each bit is defined such that it is ON in the case of bit "1" and it is OFF in the case of bit "0".

As an example of the use of the bit map 1, an audio monaural mode is assigned for the first bit, an audio stereophonic mode is assigned for the second bit, and an audio bilingual mode is assigned for the third bit.

The four bits of $UB_3$ of the second frame are set to a bit map 2. The four bits of $UB_4$ of the second frame are set to "0000". In a manner similar to the bit map 1, the bit map 2 can be defined by the user. Therefore, by using the bit maps 1 and 2, an external apparatus can be controlled on a bit unit basis.

By extracting the user's bits of the bit maps 1 and 2 in parallel, the external apparatus can be more effectively controlled.

The sixteen bits of $UB_5$ to $UB_8$ of the second frame are used as an end gap. $UB_5$ to $UB_6$ are set to "00"H. $UB_7$ and $UB_8$ are set to "00"H.

The tape code and frame code both recorded in the LTC, and material code recorded in the VITC have similar formats of length five VITC frames.

As an example, FIG. 4 shows a data format of the material code. The first frame of the material code is defined in a similar way as the first frame of the user's control code, described above. The user's bit groups $UB_1$ to $UB_2$ of the first frame are set to start bits indicative of the start of data. $UB_3$ and $UB_4$ are set to data to distinguish from the user's code or the like. $UB_5$ and $UB_6$ are set to a data serial number. Bit 0 and bit 1 of $UB_3$ denote a code type. The tape code, frame code, material code, and control code (stop code, user's code, etc.) are distinguished by the code type. Bit 2 of $UB_3$ denotes a data type and is used to distinguish between the essential data and the auxiliary data. Bit 3 of $UB_3$ is set to a bit to distinguish between main/sub. The data serial number indicates the sequence number which is sequentially decreased when the same data is repetitively recorded as a countermeasure against errors. For the codes of $UB_3$ to $UB_6$, a parity coding process for error detection is executed and a checksum is provided in $UB_7$ and $UB_8$.

A code indicative of the attribute (title, ID code of the sponsor, and the like) of the material is formed in six bits of the user's bit groups $UB_1$ and $UB_2$ of the second frame. Two bits of $UB_3$ and one bit of $UB_2$ are used as ID information to distinguish the user's code. The remaining two bits of $UB_3$ and four bits of $UB_4$ of the second frame are used to contain the number of bytes of the material ID. The material ID (12 bytes where one byte equals two user's bit groups or eight bits) is inserted in the user's bit groups $UB_5$ to $UB_8$ of the second frame, all of the user's bits of the third frame, all of the user's bits of the fourth frame, and the user's bit groups $UB_1$ to $UB_4$ of the fifth frame. The material ID denotes the character code (for instance, ASII code, JIS code, shift JIS code, etc.) indicative of the material information. "FF"H as an end gap is inserted into $UB_5$ to $UB_8$ of the fifth frame.

Figure 5:
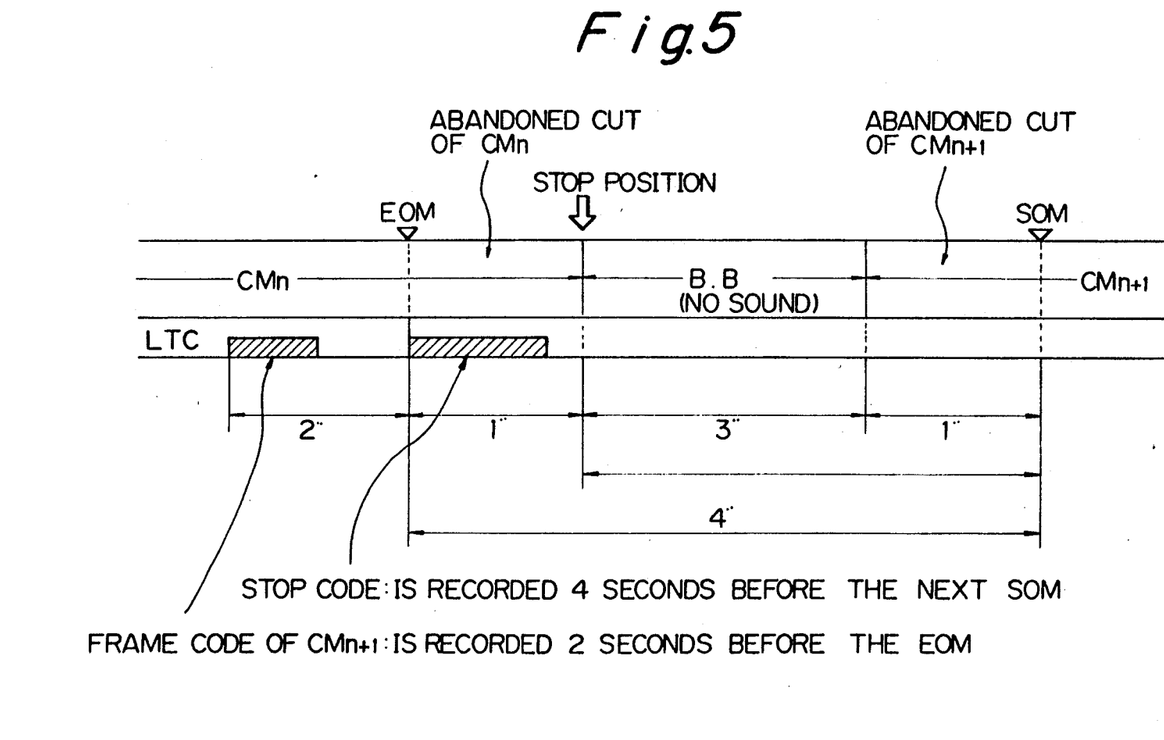
FIG. 5 is a schematic diagram showing a recording position of a stop code.

FIG. 5 shows in more detail the recording positions of a frame code and a stop code which are formed as user's bits of the time code which is recorded in the LTC area. The CM frame relates to the minimum unit of video images which are continuously reproduced.

A plurality of CM frames are formed in the master tape. The material denotes a unit which is obtained by further dividing the CM frame and indicates a program or a program of a CM or the like. The frame code is constructed such that the data of the frame information (ID of the frame, title, reproducing time, and the like) regarding the CM frame is formed in user's bits of the time code LTC in the longitudinal direction.

A shown in FIG. 5, when the video signals for the nth material $CM_n$ and the (n+1)th material $CM_{n+1}$ are recorded contiguously, the frame code of the material $CM_{n+1}$ is recorded two seconds before the on-air end position EOM of the material $CM_n$. The stop code is recorded at a position corresponding to a cue point. That is, the stop code is recorded four seconds before the broadcasting start position SOM of the next material $CM_{n+1}$. The stop code is a control code to control the transmission. When the stop code is read, the reproducing operation of the VTR is stopped and is set into the standby mode indicating readiness to reproduce and broadcast the next CM frame.

Figure 6:
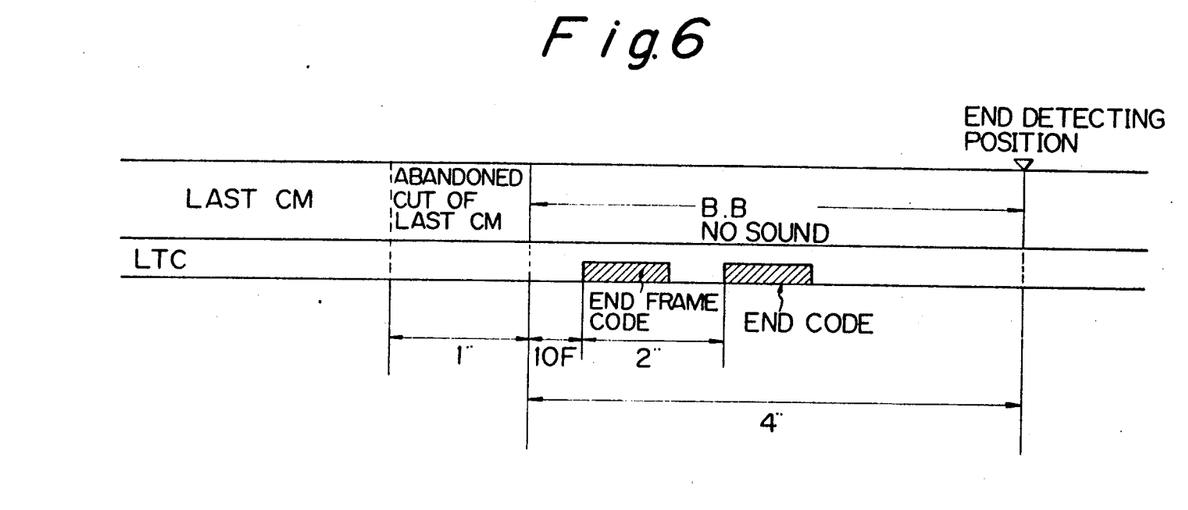
FIG. 6 is a schematic diagram showing a recording position of an end frame code and an end code.

As shown in detail in FIG. 6, the end frame code and the end code are recorded at positions on the tape following all of the CM frames of the tape.

Figures 7, 8:
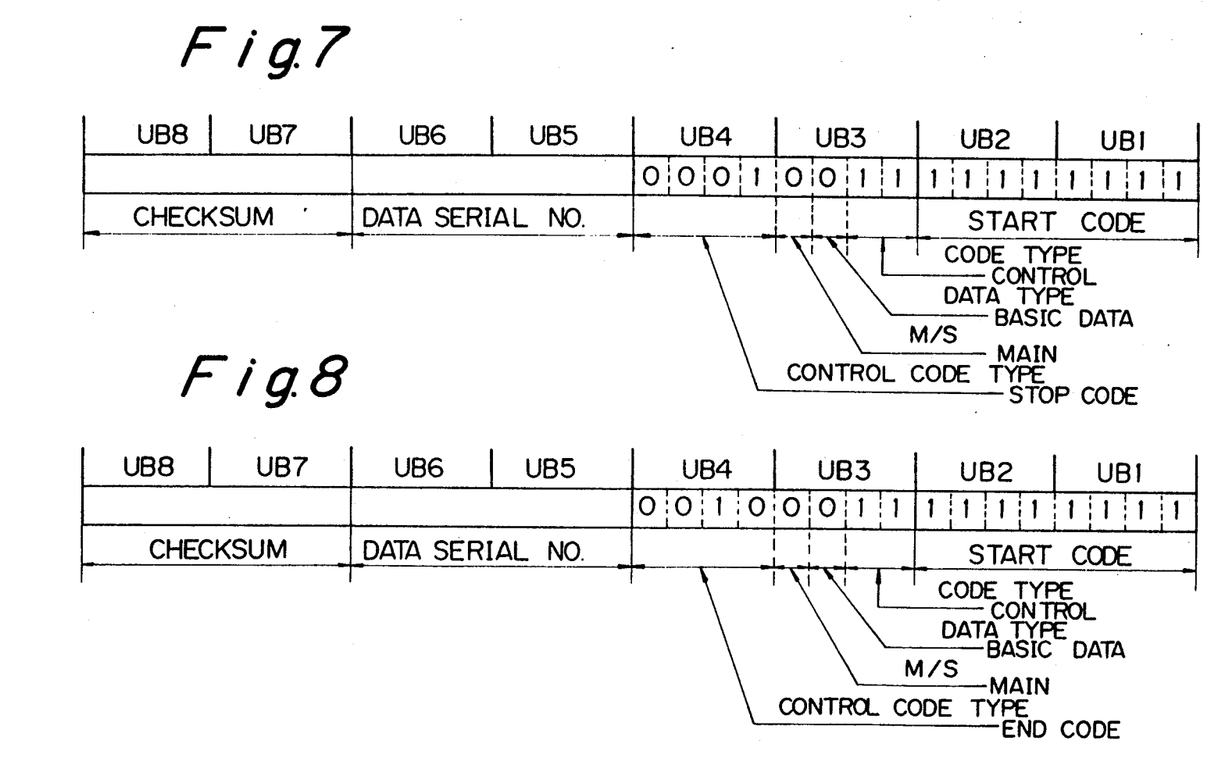
FIG. 7 is a schematic diagram showing a data format of the stop code.
FIG. 8 is a schematic diagram showing a data format of the end code.

The user's code, stop code, end frame code, end code, and the like are the control codes and their formats are fundamentally identical. For instance, as shown in FIG. 7, the stop code is formed of user's bits $UB_1$ to $UB_8$ in the LTC. $UB_1$ and $UB_2$ are set to the start code. In a manner similar to the foregoing material code, the code type, ID bit of the essential data/auxiliary data, and ID bit of the main/sub are inserted into $UB_3$. The control code type is inserted into $UB_4$. The control code type is used to identify the kind of control code. $UB_5$ and $UB_6$ contain the data serial number. A parity coding process for error detection is executed for the codes of $UB_3$ to $UB_6$. A checksum is provided in $UB_7$ and $UB_8$.

As shown in FIG. 8, the end code has a format similar to the aforedescribed stop code. The control code type indicates the end code. Further, although not shown, the end frame code has the same format as the stop code and end code except for the control code type contained in $UB_4$.

The above stop code, end code, and end frame code are continuously recorded twenty times. During reproduction when the end code is detected, a control signal of eight bits of the user's code is output.

The processes to make the master tape having the tape format as mentioned above and involving editing the CM materials will now be described with reference to FIGS. 9 and 10.

The processes to make the master tape from the CM materials can, generally, be divided into the stage of making each CM material and the stage of making the master tape by editing a plurality of CM materials. Each of the states will now be described hereinbelow.

Figure 9:
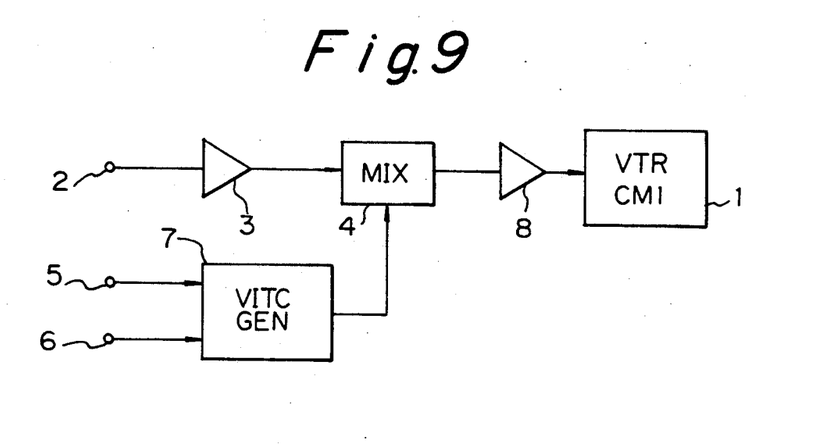
FIG. 9 is a block diagram showing an apparatus to make a CM material.

FIG. 9 shows a block diagram of a system for making CM materials. In FIG. 9, reference numeral 1 denotes a digital VTR.

A digital video signal and PCM (pulse code modulated) audio signals which were supplied to a terminal 2 are supplied to a mixing circuit 4 through an amplifier 3. Time addresses are supplied to a VITC generating circuit 7 through a terminal 5. User's bits which respectively form a material code and a user's code are supplied to the VITC generating circuit 7 through a terminal 6.

A VITC which is output from the VITC generating circuit 7 is added to the digital video signal and PCM audio signals by the mixing circuit 4. The resultant signals are supplied to the digital VTR 1 through an amplifier 8 and recorded on a magnetic tape. More specifically, the digital video signal is recorded in the video signal area of the magnetic tape. The PCM audio signals are recorded in the audio signal areas. The VITC (time code in which a user's code or a material code is formed as user's bits) is recorded in the VITC area (the twelfth and fourteenth horizontal intervals in the vertical blanking period).

As shown in FIG. 2, in the VITC area, the recording begins in the abandoned cut area before the on-air start point (SOM). Thus, the CM material is formed.

Figure 10:
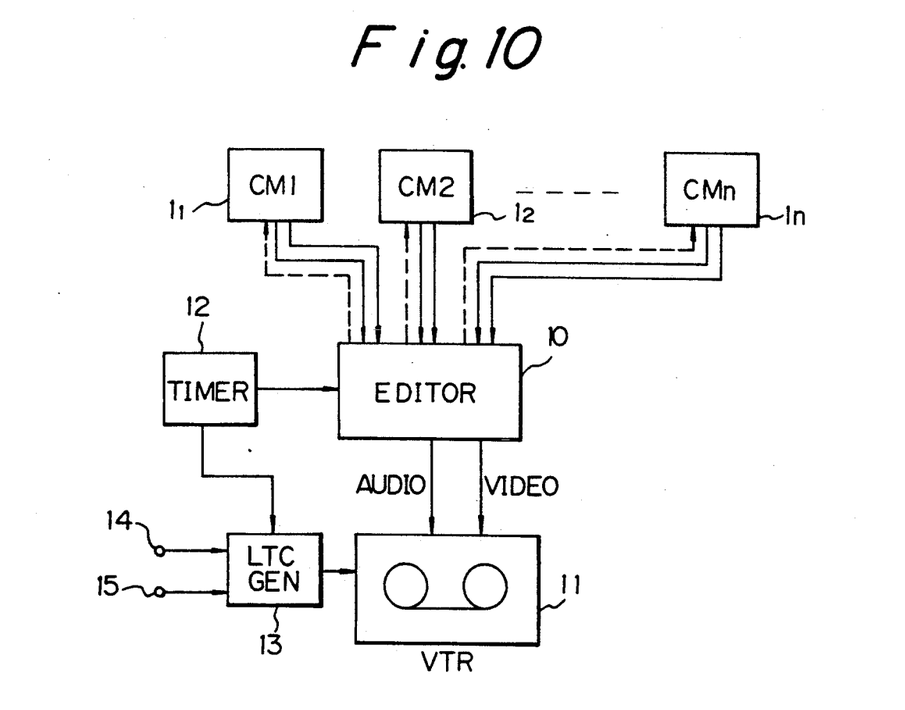
FIG. 10 is a block diagram showing a apparatus to make a master tape.

FIG. 10 shows a block diagram of a system in which one master tape is formed by editing a plurality of CM materials.

An editing apparatus 10 makes one master tape from a plurality of CM materials. A plurality of digital VTRs $1_1, 1_2, \ldots, 1_n$ respectively reproducing CM materials $CM_1, CM_2, \ldots CM_n$ and a digital VTR 11 to make a master tape are each connected to the editing apparatus 10.

A timing signal which is supplied from a timer circuit 12 is supplied to the above-mentioned editing apparatus 10 and to an LTC generating circuit 13. The timing signal controls the operations of the editing apparatus 10 and to the LTC generating circuit 13. The VTRs $1_1, 1_2, \ldots, 1_n$ are remote controlled by control signals from the editing apparatus 10. The magnetic tapes on which a plurality of CM materials $CM_1, CM_2, \ldots CM_n$ were respectively recorded as described above with reference to FIG. 9, are then selectively reproduced by VTRs $1_1, 1_2, \ldots, 1_n$, respectively.

A reproduced digital video signal and PC audio signals from one of the VTRs $1_1, 1_2, \ldots, 1_n$ are supplied from the editing apparatus 10 to the digital VTR 11 at predetermined intervals. In the LTC generating circuit 13, the time code which is supplied from a terminal 15 and user's bits which are supplied from a terminal 14 are combined and an LTC to be recorded in the LTC area is formed. The LTC is also supplied to the digital VTR 11.

In the VTR 11, the digital video signal is recorded in the video signal area of the magnetic tape, the PCM audio signals are recorded in the audio signal areas, and the LTC, that is, the time addresses and the tape code, frame code, stop code, and the like which were formed in the user's bits are recorded in the LTC area. Thus, a master tape is formed.

Figure 11:
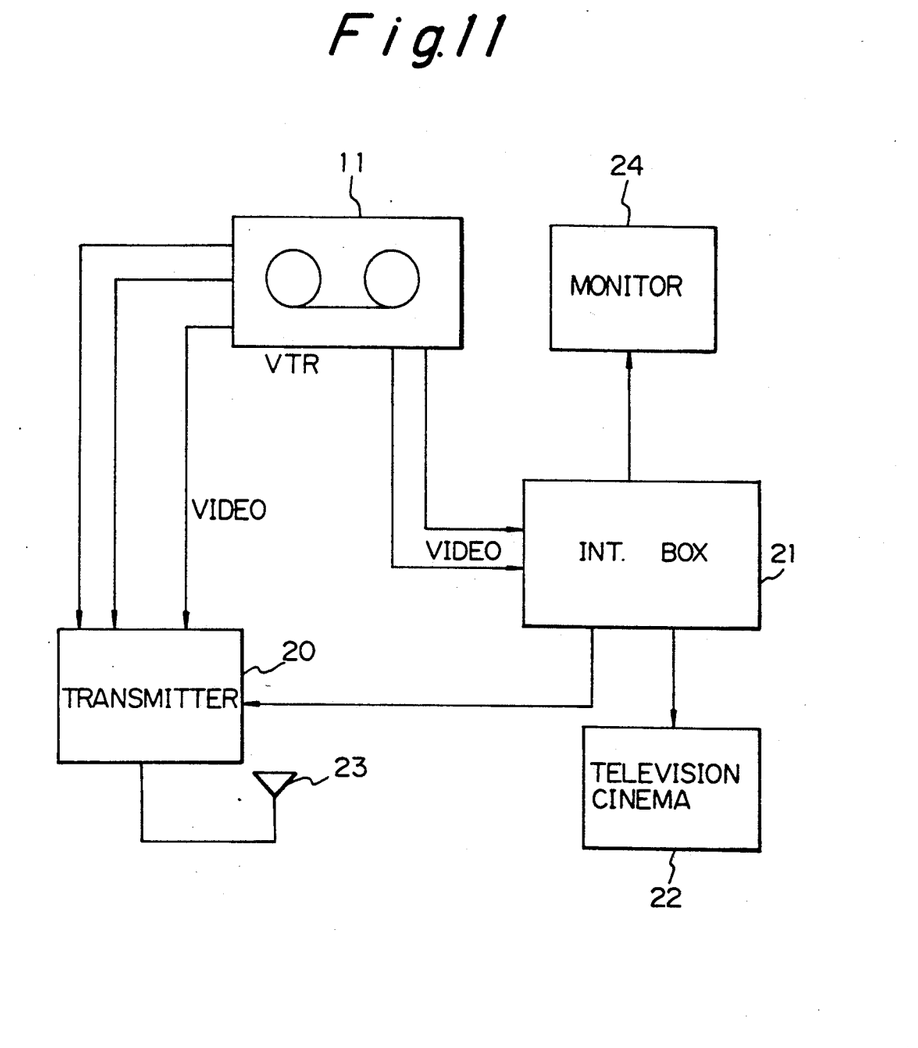
FIG. 11 is a block diagram showing an apparatus to transmit a CM.

When the master tape recorded in the format described above and shown in FIG. 1 is reproduced and CM is transmitted, external apparatus can be controlled on the basis of the user's code. FIG. 11 shows a block diagram of a system to reproduce the master tape.

In such system, the video signal and PCM audio signals of the master tape which were reproduced by the digital VTR 11 are supplied to a transmitter 20. VTR 11 may include a tape transport mechanism for longitudinally moving tape during the reproduction of information signals recorded on the tape, rotary heads for reproducing signals recorded in the information track of the tape, and fixed heads for reproducing signals recorded in a longitudinal track adjacent to the information track. Such components of VTR 11 are conventional and not shown in FIG. 11.

The video signal including the VITC and the LTC of the master tape which were reproduced are supplied to an interface box 21. An LTC reader to read the LTC and a VITC reader to read the VITC are provided in the interface box 21 and the time addresses, user's bits, and the like are read. The control signal which is specified in the user's bits of the LTC is supplied to the transmitter 20, a television cinema apparatus 22, and the like constituting external apparatuses to be controlled on the basis of the time code.

When the control signal is supplied to the transmitter 20, for instance, the audio signals are determined to be monaural, stereophonic or the like and, thereafter, transmitter 20 is subjected to a predetermined signal processing and the resultant signal passes to an antenna 23 for broadcast.

A monitor video signal which is formed by superimposing the video signal reproduced from the master tape and the characters, symbols, and the like which were inserted in the frame code, material code, and the like is supplied from the interface box 21 to a monitor television 24 on which a monitor image is displayed.

The external apparatuses, such as the transmitter 20 and television cinema apparatus 22, are triggered at desired intervals by the interface box 21 on the basis of the user's code, so that the control sequence in the user's code is executed. Therefore, the control of the external apparatuses which was previously managed by a central host computer is now distributed thereby reducing the burden on the host computer.

Figure 12:
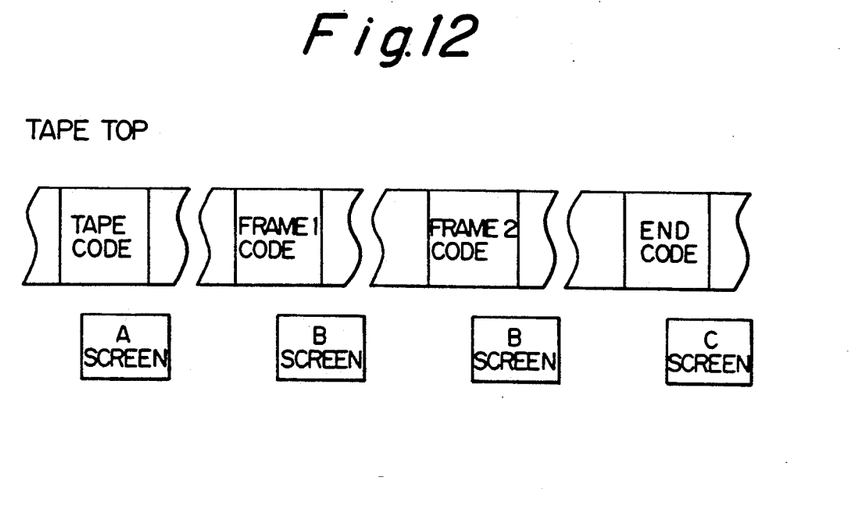
FIG. 12 is a schematic diagram showing the outline of the master tape.
Figure 13A:
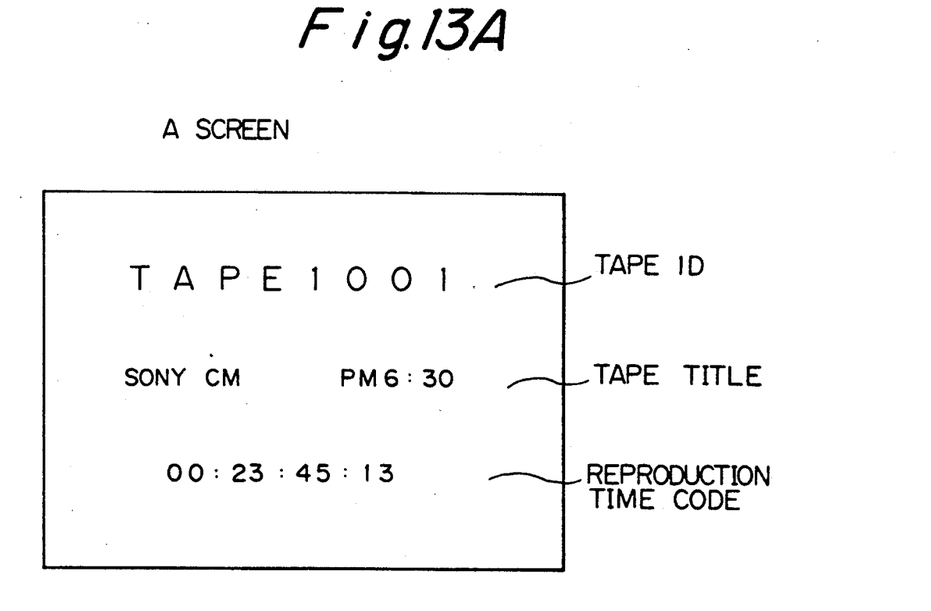
FIGS. 13A–13C are a schematic diagrams showing a display screen of a monitor television when a CM is transmitted.
Figure 13B:
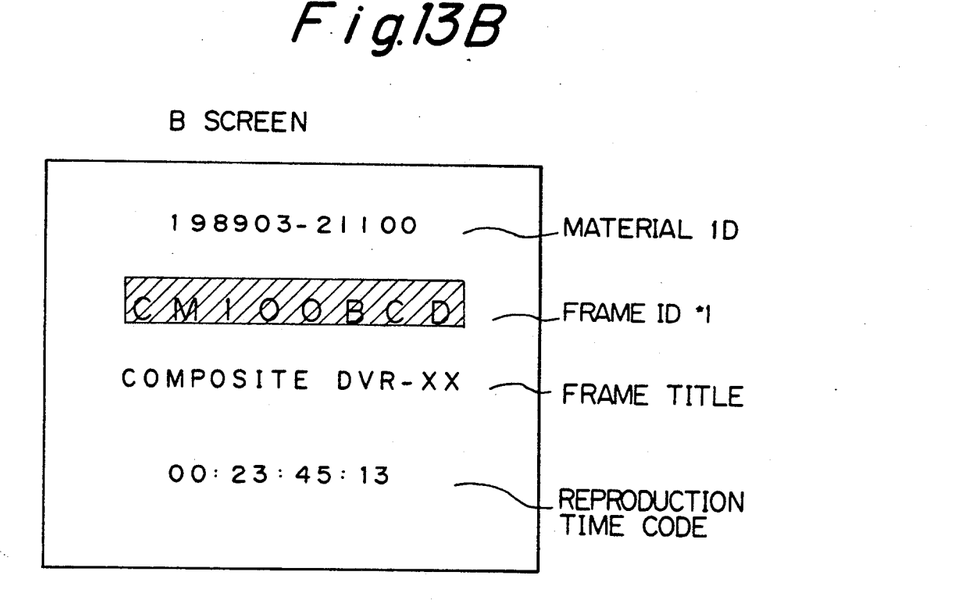

Referring now to FIGS. 12 and 13, the display of the monitor television upon CM transmission will be described. Assuming that the master tape is as shown in FIG. 12, when the tape code recorded in the LTC area of the tape top is reproduced, a picture plane corresponding to the tape code as shown. in FIG. 13A is displayed by the monitor television 24.

Next, when the first CM material is transmitted, the material code in the user's bits of the VITC is read and the frame code is read. The material ID based on the material code, the frame ID and frame title based on the frame code, and the reproduction time code of the LTC are displayed by the monitor television 24 as a picture plane shown in FIG. 13B. When the transmission of CM material is finished and the stop code is detected, the reproducing operation of the VTR is stopped. At the same time, a black mat is added to the displayed characters of the frame ID of the picture plane shown in FIG. 13B and the displayed characters are shown in reverse video. Thus, the monitor display indicates that the transmission of the corresponding CM material has been completed and that the VTR is in the standby mode, and is ready to transmit the next CM material.

Figure 13C:
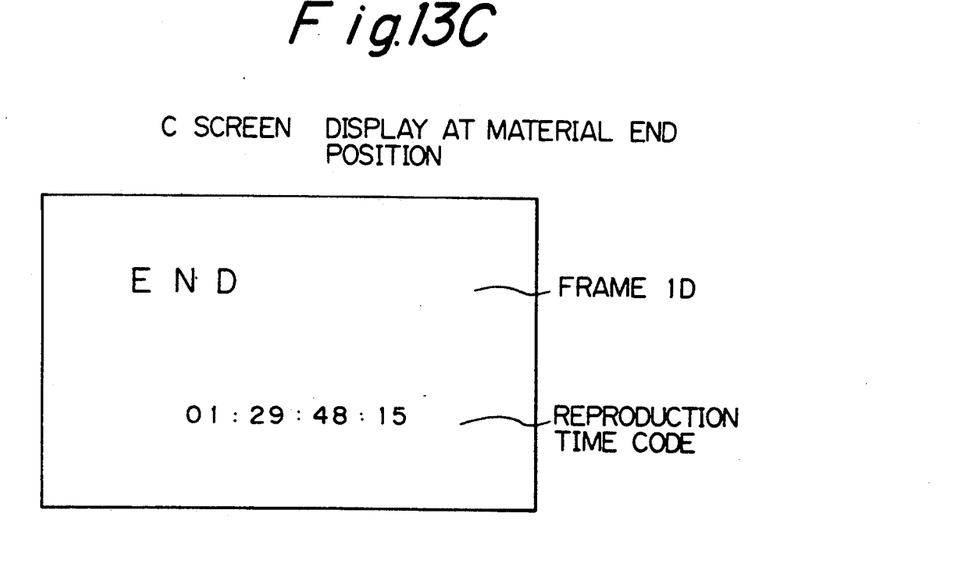

Further, when the transmission of all of the CM frames recorded in the tape is finished and the end code is detected, a picture plane shown in FIG. 13C is displayed by the monitor television 24, thus indicating the end of transmission of the CM material of the master tape.

According to the present invention, since material information is recorded in the vertical blanking interval of the video signal of the CM material, the CM material and the material information are prevented from being separated during editing.

Therefore, no error occurs when Cms are exchanged and no special care is necessary to keep the material information synchronized to its related CM material.

According to the present invention, a stop code is inserted into the time code in the longitudinal direction of the master tape and when the stop cod is detected, the reproducing operation of the VTR is automatically stopped and the ID indication is added to the screen display. Therefore, the check for the completion of transmission of a program suoh as a CM or the like and the check for the standby state indicating readiness to transmit the next CM can be easily performed.

Having described a specific preferred embodiment of the present invention with reference to the accompanying drawings, it is to be understood that the present invention is not limited to that precise embodiment, and that various changes and modifications may be effected therein by one skilled in the art without departing from the scope or the spirit of the invention as defined in the appended claims.

What is claimed is:

1. A video signal recording apparatus supplied with at least one video signal having vertical blanking intervals and constituting a plurality of programs, and with information data relating to the contents of the respective programs, comprising:

first time code generating means for generating first time code data including bits in which a material code indicative of an attribute of a respective one of said programs is formed, said attribute being selected from a group consisting of a title and a sponsor of said respective one of said programs;

inserting means receiving said video signal and said first time code data for providing an output signal in which said first time code data are inserted into a predetermined period in at least a selected one of said vertical blanking intervals of said video signal;

second time code generating means for generating second time code data including bits in which stop control data are formed; and recording means for recording said output signal of said inserting means on a video track of a master recording medium and for recording said second time code data on a longitudinal track of said master recording medium such that said stop control data are positioned on the longitudinal track in a predetermined relation to a location on said video track in which said material code is recorded by the recording means such that, when said stop control data are read during a reproducing operation said attribute is reliably displayed.

2. A video signal recording apparatus according to claim 1, wherein each of said programs consists of a first abandoned cut area for providing a boundary ahead of the respective program, a program video signal portion used for recording of said respective program, a second abandoned cut area for providing a boundary after said respective program and a black burst signal formed serially in the order named.

3. A video signal recording apparatus according to claim 2, wherein said material code indicative of an attribute of a respective one of said programs is inserted in the vertical blanking intervals of said program video signal portion.

4. A video signal recording apparatus according to claim 3, wherein said material code is inserted a predetermined number of times.

5. A video signal recording apparatus according to claim 1, wherein said first time code generating means includes means for forming a user's control code in said bits of said first time code data.

6. A video signal recording apparatus according to claim 1, in which said recording means includes:
   first recording means for recording said output signal from the inserting means on a preliminary recording medium;
   reproduction means for reproducing said output signal from said preliminary recording medium thereby generating a preliminary signal; and
   second recording means for recording said preliminary signal on said video track of said master recording medium and for recording said second time code data on said longitudinal track of said master recording medium.

* * * * *